3,644,650
SOLUTIONS OF GERMICIDAL IODINE COMPLEXES
Philip M. Sabatelli, Cincinnati, Ohio, Carmen R. Sarge, Fort Thomas, Ky., Edwin R. Loder, Cincinnati, Ohio, and Charles A. Brungs, Covington, Ky., assignors to Chemed Corporation, Cincinnati, Ohio
No Drawing. Filed June 26, 1969, Ser. No. 836,967
Int. Cl. A61k 27/00
U.S. Cl. 424—341                            3 Claims

ABSTRACT OF THE DISCLOSURE

Iodine complexes having germicidal properties are disclosed. The iodine complexes may be prepared by combining elemental iodine with a polyoxyalkylene iodine carrier which may include mixed polyethylene-polypropylene glycols and their monoethers. The iodine complexes so formed are useful in formulating iodophor compositions which, upon dilution, produce effective sanitizing solutions.

---

This invention relates to new iodine complexes and to methods of preparing and using such complexes. More particularly, the present invention relates to iodine complexes formed by combining iodine with a polyoxyalkylene iodine carrier. The present iodine complexes are useful in formulating iodophor compositions which, upon dilution, i.e. water dilution produce effective sanitizing solutions having very low foaming characteristics.

Satisfactory germicidal solutions containing iodine are difficult to prepare by simple addition of iodine to water because of the relative insolubility of elemental iodine. Attempts have been made to prepare germicidal iodine preparations which, when added to water, promptly result in formation of an iodine solution of appreciable concentration, but these attempts have realized limited success in that high foaming has resulted during use which limits the utility of such compositions in spray sanitizing solutions.

It has now been found by the practice of the present invention, that new iodine complexes having germicidal properties are provided which are characterized with high titratable iodine stablity during storage, and with very low foaming characteristics in use. The present complexes are especially useful in spray sanitizing of containers such as beverage bottles on rapidly moving filling lines.

Generally stated, the present iodine complexes are formed by combining elemental iodine with a polyoxyalkylene composition which is formed essentially of mixtures of polyethylene-polypropylene glycols and their monoethers. The present iodine complexes are easily prepared in a simple process, desirably without application of heat.

Mixed polyethylene-polypropylene glycols and their monoethers which have been found useful for complexing iodine in preparing the new complexes of the present invention are well known commercially available materials. These materials have provided an important class of synthetic lubricants sold under trade names "Ucon" by Union Carbide Corp. and "Ambiflo" by the Dow Chemical Co. These materials, it must be recognized, are chemically different from block copolymers of ethylene oxide and propylene oxide such as the class of surfactants sold under the trade name "Pluronic" by Wyandotte Chemical Co. The molecules of the block copolymers are synthesized using a caustic catalyst but the oxides are added to growing molecules as blocks of usually pure oxypropylene units or oxyethylene units. Variation of the size of the hydrophilic (oxyethylene blocks) and hydrophobic (oxypropylene blocks) produce variations of the size of the final product.

Iodine-surfactant complexes based on non-ionic surfactants such as for example $C_8$ to $C_{11}$ alkyl phenoxypolyethoxy ethanol condensates and/or poly(oxyethylene-oxypropylene) glycol block copolymers are known. These known complexes ordinarily contain 20% by weight of titratable iodine and exhibit considerable foaming characteristics in use as spray sanitizing solutions. When these complexes are diluted with water to the usual available iodine concentrations for commercial iodophor products, i.e. about 1.75% to about 2.0%, the diluted solutions are characterized with production of a very copious and stable foam which is undesirable in spray sanitizing processes.

Compositions found useful as iodine carriers herein may be described as mixed polyethylene-polypropylene glycols and their monoethers. These materials may be represented chemically as

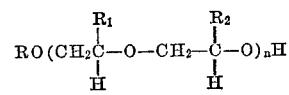

where R, $R_1$ and $R_2$ represent hydrogen or a lower alkyl group of about 1 to 6 carbon atoms. In a preferred embodiment, R is butyl, $R_1$ is hydrogen, and $R_2$ is methyl.

The oxide units of the above mixed products are of random distribution, the character $n$ is a whole number, and no effort is made to distribute the ethylene oxide and propylene oxide units along the chain of the molecule in any particular manner. Bland liquids, ranging from free-flowing to very viscous consistencies are available and it is necessary that they be water soluble at normal temperatures. Water solubility of these products is governed by the ratio of ethylene oxide to propylene oxide used to prepare the final product. Generally, ethylene oxide units in the chain are hydrophilic and propylene oxide units hydrophobic. Products which contain at least 40 percent by weight of ethylene oxide units are generally water soluble at room temperature. Other than the first few members of the series, products prepared from propylene oxide units alone are water insoluble.

Iodine carriers of the present invention are characterized as polyoxyalkylene products having an average molecular weight in the range from about 300 to about 4,000, formed preferably of a mixture of 50% ethylene oxide and 50% propylene oxide. These products may be obtained generally by addition to a monohydroxy aliphatic alcohol, of a mixture of alkylene oxides containing ethylene oxide and 1,2-propylene oxide in an oxide ratio from 75/25 to 10/90 ethylene oxide/1,2-propylene oxide with a 50/50 ratio for the preferred products. The oxide ratio represents the oxide units which may be used in forming the monohydroxy alcohol addition products. The amount of 1,2-propylene oxide in the mixture is from one-third to nine times the amount of ethylene oxide present by weight. The reaction which takes place between the alcohol, the ethylene oxide and the 1,2-propylene oxide appears to be a simple addition wherein alkylene oxide molecules undergo conversion to the corresponding oxyalkylene radicals as illustrated by the following general equation:

$$ROH + Y(C_2H_4O) + Z(CH_3CH=CH_2O) \rightarrow R(OC_nH_{2n})_xOH$$

or otherwise expressed as

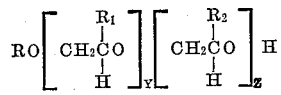

wherein R may be hydrogen or lower alkyl, $y$ and $z$ represent the moles of ethylene oxide and propylene oxide respectively; $n$ is both 2 and 3 in a single molecule, the number of times $n$ has a value of 2 being equal to $y$ and the number of times $n$ has a value of 3 being equal to $z$; and $x$ is the total number of the oxyethylene and oxy 1,2-propylene groups, being equal to the sum of y and z.

The present iodine carriers are viscous liquids which are actually a complex mixture of either the monohydroxy or dihyroxy derivatives having polyoxyethylene chains of different lengths. By modifications of reaction conditions, products of increased average molecular weights, and viscosity may be prepared to suit any particular use desired for the iodine carrier fluids. A more detailed description of compositions useful as iodine carriers in the practice of the present invention may be found in U.S. Pat. Nos. 2,425,755 and 2,425,845, the disclosures of which, where applicable, are incorporated herein by reference.

It has been surprisingly found that the materials forming iodine carriers of the persent invention effectively carry iodine and upon combination with an aqueous medium, releases iodine in effective quantities such that the use compositions serve effectively as a germicidal composition having very low foaming characteristics. Because of the low foaming characteristics, the present iodine complexes have great utility in spray sanitizing processes.

Especially useful iodine carriers for practice of the present invention include materials identified by the trademark "Ucon" by Union Carbide Co. These materials may be described as polyalkylene glycols prepared by reacting mixtures of alkylene oxides such as a mixture of ethylene oxide and propylene oxide to form a random hetero-polymer. In all regards, these materials useful herein are water soluble and desirably have viscosities of about 55 to about 5100 S.U.S. at 100° F.

The iodine complexes of the present invention may contain from about 1% to about 30% by weight of elemental iodine. For preparation of low foaming sanitizing solutions from such complexes, it is preferred that the complex contains about 20% to 30% of iodine by weight based on the total weight of the complex.

In order to promote germicidal activity of the present iodine complexes, and to provide optimum sanitizing effect, it is desirable to include in the diluted compositions of this invention a small amount of an acid, whereby the pH of the use dilutions (10–50 parts per million iodine) will be generally at a pH of below 6 and preferably about pH 2 to about pH 5 to maintain a stable system and prevent the loss of iodine in solution.

Any suitable acid may be used to provide optimum stability and sanitizing effects although it is preferred to use lactic acid, hydroxyacetic acid, and phosphoric acid. Other useful acids include acetic acid, boric acid, citric acid, iodic acid, itaconic acid, oxalic acid, and the like. Amounts between about 1% to about 10% by weight of acid based on the total amount by weight of the iodine complex may be found useful.

The iodine complexes of this invention usually will contain about 20% to about 30% by weight, of complexed elemental iodine, based on total weight of the complex. Concentrated solutions of the complexes prepared with the iodine carrier, elemental iodine and an acid ordinarily contain about 20% by weight iodine based on total weight of all ingredients. Iodine sanitizing solutions, in order to meet the requirements of the Food and Drug Administration of the U.S. Department of Health, Education, and Welfare, should contain about 10 to 50 parts per million titratable iodine at the use concentration. Iodophor products sold to ultimate users in the concentrated form contain about 1.75% to 2% available iodine. Thus, the present complexes or their concentrated solutions must be diluted to a level to provide iodophor sanitizing solutions complying with the aforesaid requirements.

It has also been found that addition of suitable polyalkylene glycols to the aqueous solution in diluting the present iodine complexes to the 1.75% to 2% iodine level satisfactorily improves iodine release elvel and maintains a low foam level in use. Amounts of polyalkylene glycols in the range o fabout 0.4 to about 2.5 parts, and more preferably about 0.75 to about 1.5 parts of polyalkylene glycols per part of the present iodine complex are useful and desirable.

The invention is illustrated by the following non-limiting specific examples.

EXAMPLE 1

75 parts by weight of a water soluble butoxy polyoxypropylene polyoxyethylene glycol was added to a glass vessel equipped with a magnetic driven stirrer. This polyoxyalkylene glycol is commercially available from Union Carbide Corp. under the trade name "Ucon 50 HB Series" and appears to be a random, hetero-polymer molar mixture of 50/50 ethylene oxide and propylene oxide reacted with an oxylatable material such as butanol using potassium hydroxide as a catalyst. The polyoxyalkylene glycol of this example had a visocsity of 5100 Saybolt Universal Seconds at 100° F. To the 75 parts by weight of the polyoxyalkylene glycol was added 5 parts by weight of 50% lactic acid and 20 parts by weight elemental iodine ($I_2$). After mixing at room temperature for 3 hours, a dark brown liquid free of solid matter and having a viscosity essentially that of the starting polyoxyalkylene glycol was obtained. The dark brown liquid was found to contain 15.96% titratable iodine using a sodium thiosulfate titration to the starch end point. At the end of 60 days, the iodine complex was again tested and found to contain 15.89% titratable iodine by the same testing procedure.

EXAMPLE 2

To obtain an iodophor composition which bears a titratable iodine of 1.0% to 2.0%, a composition was made by blending with sufficient agitation in a glass vessel the following ingredients in the order listed:

Component: Parts by weight
  Water _____ 63.9
  Lactic acid (50%) _____ 4.9
  Polyalkylene glycol _____ 19.8
  Example 1 concentrate _____ 11.4
Theoretical iodine: (Based on 15.9% titratable iodine content in the concentrate) 1.8%
Titratable Iodine: 1.56%.

EXAMPLE 3

To obtain an iodophor composition which bears a titratable iodine of 4–5%, the following composition was made using the same mixing technique as in Example 2.

Component: Parts by weight
  Water _____ 48.4
  Lactic acid (50%) _____ 9.7
  Polyalkylene glycol _____ 10.6
  Example 1 concentrate _____ 31.3
Theoretical titratable iodine: (Based on 15.9% titratable iodine in the concentrate) 4.95%
Titratable Iodine: 4.68%.

EXAMPLE 4

To demonstrate the stability of the iodine complexes of Examples 2–3, samples were stored at 120° F. for 72 hours.

| Sample | Initial titratable iodine, percent | After 72 hours, percent |
|---|---|---|
| Example 2 | 1.39 | 1.38 |
| Example 3 | 4.55 | 4.49 |

EXAMPLE 5

To demonstrate the unique low foaming properties of compositions bearing the concentrate made in Example 1, complexes made in Examples 2 and 3 were tested using the Ross Miles Foam Test, (ASTM Method D1173–53) in a series which included an iodophor considered low foaming and which was made by a method of the prior art which is as follows:

| Components: | Parts by weight |
|---|---|
| Water | 61.25 |
| Phosphoric acid (75%) | 20.00 |
| Alkylphenoxpoly (ethyleneoxy) ethanol | 10.00 |
| Clean front concentrate [1] | 8.75 |

[1] 20% iodine bearing composition from West Chemical-New York.

The products of Examples 2, 3 and 5 were diluted in both Cincinnati tap water (184 p.p.m.) and distilled water to yield the same parts per million of titratable iodine commonly used in spray washing techniques. The results appear in Table A following:

Samples containing about 4.93% titratable iodine were stored at room temperature and at 120° F. The following stability results were noted:

| | Percent titratable iodine | |
|---|---|---|
| Days stored | At room temp. | At 120° F. |
| 0 | 4.93 | 4.93 |
| 16 | 4.86 | 4.50 |
| 52 | 4.64 | 4.45 |
| 71 | 4.55 | 4.44 |
| 113 | 4.55 | 4.43 |
| 136 | 4.50 | 4.43 |
| 167 | 4.44 | 4.43 |
| 180 | 4.43 | 4.43 |

From the above example, it will be appreciated that the present compositions are highly iodine-stable in storage.

TABLE A

| | Distilled water, mm./mm. | | | Cincinnati tap water (184 p.p.m. CaCo₃), mm./mm. | | |
|---|---|---|---|---|---|---|
| Titratable iodine, p.p.m. | Example II | Example III | Prior art sample | Example II | Example III | Prior art sample |
| 5 | 8/0 | 4/0 | 27/25 | 0/0 | 0/0 | 30/25 |
| 10 | 0/0 | 0/0 | 38/37 | 0/0 | 0/0 | 35/32 |
| 15 | 10/0 | 1/0 | 40/38 | 0/0 | 0/0 | 37/34 |
| 20 | 5/0 | 3/0 | 44/40 | 0/0 | 0/0 | 45/39 |
| 25 | 0/0 | 7/0 | 90/90 | 0/0 | 0/0 | 48/44 |
| 50 | 2/0 | 6/5 | 110/90 | 0/0 | 0/0 | 74/60 |

EXAMPLE 6

The composition of Example 3 was compared with sodium hypochlorite by the Available Chlorine Germicidal Equivalent Concentration Method, A.O.A.C., 10th. Edition, 1965, page 84. The results experienced are duplicated below:

(I) *Salmonella typhosa* ATCC No. 6539

[Phenol resistance: 1:90]

| Germicide | Conc. p.p.m. Avail. Cl or I | Subculture series | | | | | | | | | |
|---|---|---|---|---|---|---|---|---|---|---|---|
| | | 1 | 2 | 3 | 4 | 5 | 6 | 7 | 8 | 9 | 10 |
| NaOCl | 200 | − | − | − | − | − | − | + | + | + | + |
| | 100 | − | − | − | + | + | + | + | + | + | + |
| | 50 | − | + | + | + | + | + | + | + | + | + |
| Example I iodine complex. | 25 | − | − | − | − | − | − | − | − | − | − |
| | 20 | − | − | − | − | − | − | − | − | − | − |
| | 10 | − | − | − | − | − | − | + | + | + | + |

(II) *Staphylococcus aureus* ATCC No. 6538

[Phenol resistance: 1:65]

| Germicide | Conc. p.p.m. Avail. Cl or I | Subculture series | | | | | | | | | |
|---|---|---|---|---|---|---|---|---|---|---|---|
| | | 1 | 2 | 3 | 4 | 5 | 6 | 7 | 8 | 9 | 10 |
| NaOCl | 200 | − | − | − | + | + | + | + | + | + | + |
| | 100 | − | − | + | + | + | + | + | + | + | + |
| | 50 | − | + | + | + | + | + | + | + | + | + |
| Example I iodine complex | 25 | − | − | − | − | − | − | − | − | + | + |
| | 20 | − | − | − | − | − | − | − | − | + | + |
| | 10 | − | − | − | − | + | + | + | + | + | + |

Ledger: − indicates no growth; + indicates growth.

EXAMPLE 7

A composition was prepared using the following materials in amounts indicated:

| Component: | Parts by weight |
|---|---|
| Water | 18.4 |
| Lactic acid (50%) | 39.7 |
| Ucon 50 HB of Example 1 except having a viscosity of 100 SUS at 100° F. | 10.6 |
| Example 1 concentrate | 31.3 |

EXAMPLES 8–16

Using a Hobart AM 9 institutional dishwasher, tests were run to determine the effectiveness of the present compositions with respect to bactericidal properties. 4 plates, each being sterilized and contaminated by dipping in a solution of *Staphylococcus aureus* in buffered distilled water and air dried were effectively sanitized by the normal rinse cycle of this dishwater (12 seconds) when sprayed at a temperature of 140° F. and containing 25 parts per million titratable iodine as presented by a dilution of the product of Example 7. In each case the plates were completely sanitized while a high bacteria count remained when rinsed under the same conditions without the use of the product of Example 7.

In the following summary of tests, I represents the number of bacteria per milliliter of solution used to contaminate the plates, II represents the number of bacteria remaining on the dry plates before testing, III represents the number of bacteria remaining after a 12 second rinse of 140° F. Cincinnati tap water, and IV represents the number of bacteria remaining after a 12 second rinse of 140° F. Cincinnati tap water containing 25 parts per million titratable iodine presented by a dilution of Example 7.

| Example No. | I | II | III | IV |
|---|---|---|---|---|
| 8 | 3,340,000 | 6,130 | 508 | 0 |
| 9 | 3,140,000 | 9,190 | 672 | 0 |
| 10 | 4,900,000 | 18,000 | 500 | 0 |
| 11 | 13,600,000 | 10,000 | 3,000 | 0 |
| 12 | 12,500,000 | 34,000 | 140 | 0 |
| 13 | 12,700,000 | 7,480 | 114 | 0 |
| 14 | 11,600,000 | 30,000 | 650 | 0 |
| 15 | 6,000,000 | 30,000 | 130 | 0 |
| 16 | 36,200,000 | 2,010,000 | 12,900 | 0 |

EXAMPLE 17

In mechanical spray operations high foam is not only undesirable but is detrimental to cleaning and sanitizing efficiency. In machine dishwashing iodine has not been used as a sanitizing agent because of the high foaming characteristics attributed to its carrier. Sanitizing has been achieved by the use of a final rinse of 180° F. minimum which may be maintained by an electrical heat booster or steam heat exchanger, which are expensive to maintain and operate.

When 38 milliliters of a product of Example 7 was added to a twenty gallon recycling rinse tank at 140° F. after five minutes there was observed an extremely low operating level of unstable foam which collapsed immediately when recycling was stopped.

When 38 milliliters of the prior art iodine complex of Example 5 was added to the same tank under the same conditions within five minutes there was a stable copious foam which caused the pump to cavitate and remained for several minutes after the pump was shut down.

EXAMPLE 18

The composition of Example 7 was injected into the final rinse of an institutional dishwasher in such a proportion so as to deliver 25 parts per million titratable iodine. The rinse temperature was lowered to 140° F. and dishes were washed in the usual manner. With the use of this composition, glasses and tableware were washed and dried with less film and spots than when using no additive and 180° F. water for sanitizing. It was also noted that with the use of this composition, the rinse tank foam which was present from food soil was greatly reduced. To demonstrate the stability of this rinse solution a sample collected was titrated four hours after the test and still titrated more than 20 parts per million titratable iodine.

The present germicidal iodine complexes have been found to be effective as a final rinse additive to the final rinse step of spray dishwashing machines. It has also been found that by using the present iodine complexes to sanitized glasses, china, and tableware, that a final rinse temperature of 140° F. is sufficient rather than the usual 180° F. temperature used when non-sanitizing rinse additives are used. Use of the present composition thus eliminates the need for expensive heat boosters in dishwashing machines or similar operations which are necessary to provide the 180° F. final rinse for conventional sanitizing.

It is understood that the foregoing detailed description is given merely by way of illustration and that many variations may be made therein without departing from the spirit of this invention.

What is claimed is:

1. A water dilution of an iodine complex, said dilution having germicidal activity, a water dilution pH of below 6, and having between about 1% to about 10% by weight of an acid based on the total weight of the iodine complex, said iodine complex comprising iodine, and an iodine carrier having the general formula:

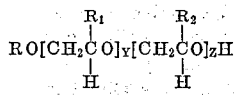

wherein R represents hydrogen or a lower alkyl group of about 1 to 6 carbon atoms; $R_1$ is hydrogen, and $R_2$ is methyl, Y and Z are disposed in a ratio of from 75/25 to 10/90 of Y to Z respectively, and the carrier has a molecular weight in the range of about 300 to about 4,000, said members

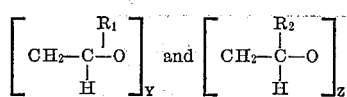

being disposed in random distribution along the chain of the molecule, and said dilution having about 1% to 2% titratable iodine.

2. The water dilution of claim 1 wherein the ratio of Y to Z is 50/50, and wherein R is butyl.

3. The water dilution of claim 1 wherein the acid is lactic acid and the pH is about 2 to about 5.

References Cited

UNITED STATES PATENTS 3,285,816  11/1966  Kaplan et al. _____ 424—150
3,355,386  11/1967  Cantor et al. _____ 424—150
3,438,907  4/1969   Schmolka _____ 424—150

SAM ROSEN, Primary Examiner

U.S. Cl. X.R.
424—78, 150